(12) United States Patent
Rinne (10) Patent No.: US 7,870,950 B2
(45) Date of Patent: Jan. 18, 2011

(54) V-SHAPED PRODUCT CONVEYOR

(76) Inventor: Rhett L. Rinne, 3628 Union School Rd., Chester, IL (US) 62233

( * ) Notice: Subject to any disclaimer, the term of this patent is extended or adjusted under 35 U.S.C. 154(b) by 402 days.

(21) Appl. No.: 11/769,809

(22) Filed: Jun. 28, 2007

(65) Prior Publication Data

US 2009/0000919 A1  Jan. 1, 2009

(51) Int. Cl.
B65G 15/60 (2006.01)
(52) U.S. Cl. ............... 198/860.1; 198/861.2; 198/830; 198/831; 198/835; 198/839
(58) Field of Classification Search ............ 198/861.2, 198/830, 831, 835, 839
See application file for complete search history.

(56) References Cited

U.S. PATENT DOCUMENTS

| | | | |
|---|---|---|---|
| 3,628,651 A | 12/1971 | Wolzak | |
| 3,687,258 A | 8/1972 | Wolzak | |
| 3,880,751 A | 4/1975 | Wirth | |
| 3,913,730 A | 10/1975 | Gruodis et al. | |
| 4,461,378 A | 7/1984 | Roth | |
| 4,793,470 A * | 12/1988 | Andersson | 198/823 |
| 5,103,967 A * | 4/1992 | Stoll | 198/823 |
| 5,392,927 A | 2/1995 | Haverkamp Begemann et al. | |
| 5,544,733 A | 8/1996 | Shaver | |
| 6,015,039 A | 1/2000 | Bonnet | |
| 6,761,264 B2 | 7/2004 | Steeber et al. | |
| 6,827,198 B1 | 12/2004 | Costanzo | |
| 6,860,377 B2 | 3/2005 | Brixius et al. | |
| 6,966,430 B2 * | 11/2005 | Swinderman et al. | 198/811 |
| 7,004,301 B2 | 2/2006 | Brixius et al. | |
| 7,025,195 B2 | 4/2006 | Brixius et al. | |

* cited by examiner

*Primary Examiner*—Gene Crawford
*Assistant Examiner*—Kavel P Singh
(74) *Attorney, Agent, or Firm*—Ronald E. Smith; Smith & Hopen, P.A.

(57) ABSTRACT

A conveyor system includes first and second upstanding posts disposed in longitudinally spaced apart relation to one another. Each post is surmounted by forward and rearward support arms that form a "V"-shape. A forward drive belt is mounted for rotation along a path of travel perpendicular to the forward support arms. A first embodiment cradles a product container between the forward drive belt and a rearward primary support arm. A second embodiment includes the first embodiment structure and adds a rearward secondary support arm. A third embodiment includes the primary but not the rearward secondary support arm, the forward drive belt and a forward secondary support arm. A fourth embodiment includes the rearward primary and secondary support arms, the forward drive belt and a forward secondary support arm. The product container is tilted from vertical so that the conveyor follows a path of travel including curvatures having no guide rails.

8 Claims, 6 Drawing Sheets

V-SHAPED PRODUCT CONVEYOR

BACKGROUND OF THE INVENTION

1. Field of the Invention

This invention relates to product conveyors. More particularly, it relates to a conveyor system that eliminates or reduces the use of guide rails.

2. Description of the Prior Art

Conventional conveyor systems carry product containers on flat, level belts or other driving surfaces. When the path of travel includes a curvature, guide means are provided so that the product container will encounter such guide means and be deflected thereby onto a changed path of travel. Curvatures of lengthy extent thus require more guide rails than shorter curvatures.

Thus there is a need for a conveyor system that can follow a path of travel that includes curves but which does not require guide rails.

Conventional conveyor systems are not always designed for the comfort of the workers who load and unload the product.

There is a need as well to convey products that are positioned ergonomically relative to workers who load and unload product onto and from the conveyor.

A need further exists for a product conveyor that operates at a lower cost than conventional product conveyors.

Moreover, there is a need for conveyor systems that can be easily re-configured to handle small product containers, tall but narrow product containers, wide but low profile product containers, and large product containers.

However, in view of the art considered as a whole at the time the present invention was made, it was not obvious to those of ordinary skill in this art how the identified needs could be met.

SUMMARY OF INVENTION

The long-standing but heretofore unfulfilled need for a guide rail-less conveyor system is now met by a structure that includes an upstanding first height-adjustable post, an upstanding second height-adjustable post disposed in longitudinally spaced apart relation to the first post, a first forward support arm and a first rearward support arm surmounting the first post and collectively forming a "V"-shape, and a second forward support arm and a second rearward support arm surmounting the second post and also collectively forming a "V"-shape.

The novel structure is not limited to an apparatus having just said first and second posts and support arms, nor is it limited to a plurality of such structures disposed in longitudinal array. Any number of posts, whether height-adjustable or not, may be employed, and said posts may collectively define any path of travel. The path of travel may include both straight and curved sections, including ninety degree (90°) turns, as well as elevated and lowered sections. Moreover, the novel structure may interface with conventional conveyor systems that transport product containers in an upright position and which therefore rely upon guide rails to constrain product containers to execute turns. More particularly, the novel structure may feed a conventional conveyor, or it may be fed by a conventional conveyor.

The use of the letter "V" in describing the novel structure has several advantages. First of all, the left side of the "V" may be thought of as the passive side of the conveyor structure that supports a product container that has been knocked over to its left, its bottom wall no longer sitting squarely atop a level support surface. The right side is then thought of as the active side. It includes the driving means that causes movement of the product container along a path of travel. The tilted bottom wall of the package is drivingly engaged by the right side of the "V"-shaped conveyor structure. Instead of left and right, or passive and active, the opposing sides of the "V"-shaped structure may also be referred to as rearward and forward.

The passive or rearward side of the structure may include rotatably mounted wheels that are positioned along the extent of the conveyor structure to facilitate the work of the active or forward side of the novel apparatus by reducing the resistance to movement of the product container. The passive side may also include an elongate rail against which the product container leans as it is driven along its path of travel by the active side of the apparatus. A rail may produce more friction but a structure having a rail that supplants multiple wheels is less expensive to make and maintain.

Of course, the left and right sides mentioned in the preceding paragraphs may be switched so that a product container tilts to the right and is passively supported by the right side of the "V"-shaped structure, with the left side actively engaging the bottom of the product container and driving it along a path of travel.

The use of the letter "V" is further helpful because a first embodiment of the invention may be thought of as a lower case "v," a fourth embodiment as an upper case "V," and second and third embodiments as having parts of both embodiments.

More particularly, a first embodiment includes a pair of longitudinally spaced apart posts, each surmounted by a pair of rearward and forward support arms that collectively form a lower case "v." A rearward primary support rail interconnects respective distal ends of the rearward support arms and slidingly supports a product container. Alternatively, a plurality of passive support wheels may be rotatably mounted along the extent of the rail to reduce the friction that must be overcome to transport the product container. Each passive support wheel is rotatable about an axis substantially perpendicular to the rearward primary support rail. A conveyor belt or equivalent driving structure is mounted on the forward side of the structure. This first embodiment is all that is needed to convey a product container having a size that fits such structure, i.e., having a low profile and a narrow width.

A second embodiment enables the transportation of a product container having a narrow width but a greater height extent than the product container of the first embodiment. The forward side of the structure is thus the same as in the first embodiment. A rearward extension is mounted to each of the respective rearward support arms and a rearward secondary support rail is supported at its opposite ends by respective distal free ends of the rearward extensions. As in the first embodiment, friction-reducing passive wheels may be rotatably mounted along the length of the rearward secondary support rail, or the rail itself may serve as a passive support means.

A third embodiment conveys a product container having a low profile as in the first embodiment so that no extensions are needed for the passive side of the apparatus, and a wide bottom wall so that extensions and a forward secondary support rail are added to the active side. Passive, rotatably mounted wheels may also be provided along the extent of the forward secondary support rail.

A fourth embodiment has the same structure as the second, but an extension is secured to each forward support arm, in effect lengthening each forward support arm. A secondary forward support rail connects contiguous distal ends of the forward extensions. A plurality of passive rotatably mounted wheels may be mounted along the extent of the secondary forward support rail, or said rail may itself be used to passively, slidingly support a product container in the absence of such wheels. This fourth embodiment enables the conveyance of a product container having a large width and a tall profile.

The four combinations are thus short-short (first embodiment where no extensions are added to the rearward and forward support arms), long-short (second embodiment where an extension is added to the passive side but not to the active side), short-long (third embodiment where an extension is added to the active side but not to the passive side), and long-long (fourth embodiment where an extension is added to both the passive and active sides).

In the first embodiment, each product container is supported at its bottom wall by the forward drive belt or equivalent drive means and at a sidewall by a rearward primary support rail or by a plurality of rearward primary support wheels mounted along the extent of said rearward primary support rail. In the second embodiment, each product container is supported at its bottom wall by the forward drive means and at a sidewall by a rearward primary support rail or a plurality of rearward primary support wheels mounted along the extent of said rearward primary support rail, and by a rearward secondary support rail or a plurality of rearward secondary support wheels mounted along the extent of said rearward secondary support rail. In the third embodiment, each product container is supported at its bottom wall by the forward drive belt, by a forward secondary support rail or by a plurality of forward secondary support wheels mounted along the extent of said forward secondary support rail, and at a sidewall by a rearward primary support rail or a plurality of rearward primary support wheels mounted along the extent of said rearward primary support rail. In the fourth embodiment, each product container is supported at its bottom wall by the forward drive belt and a forward secondary support rail, or by a plurality of forward secondary support wheels mounted along the extent of said forward secondary support rail, and at a sidewall by a rearward primary support rail or a plurality of rearward primary support wheels mounted along an extent of said rearward primary support rail and by a rearward secondary support rail or by a plurality of rearward secondary support wheels mounted along an extent of said rearward secondary support rail.

In all four embodiments, the container is tilted from a vertical axis when so supported and held in the tilted configuration by gravity so that the conveyor system may follow a path of travel including curvatures that includes no guide rails.

An important object of the invention is to provide a product container conveyor apparatus that negotiates corners and changes in elevation in the absence of guardrails.

Another important object is to provide a conveyor system that is easily adjustable to handle product containers having a narrow width and a low profile, a narrow width and a high profile, a broad width and a low profile, and a broad width and a high profile.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
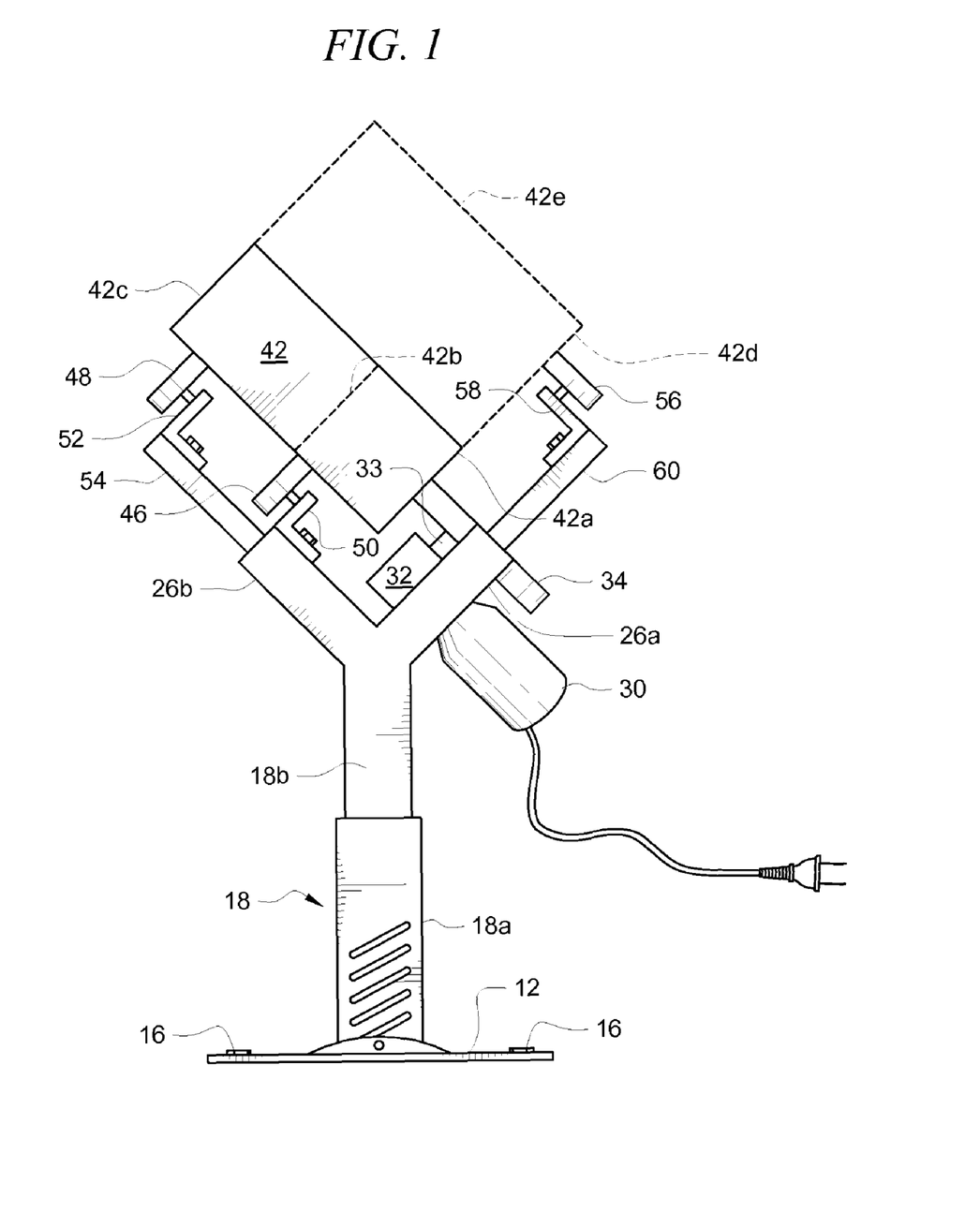
FIG. 1 is an end elevational view of a straight section of the novel apparatus.
Figure 2:
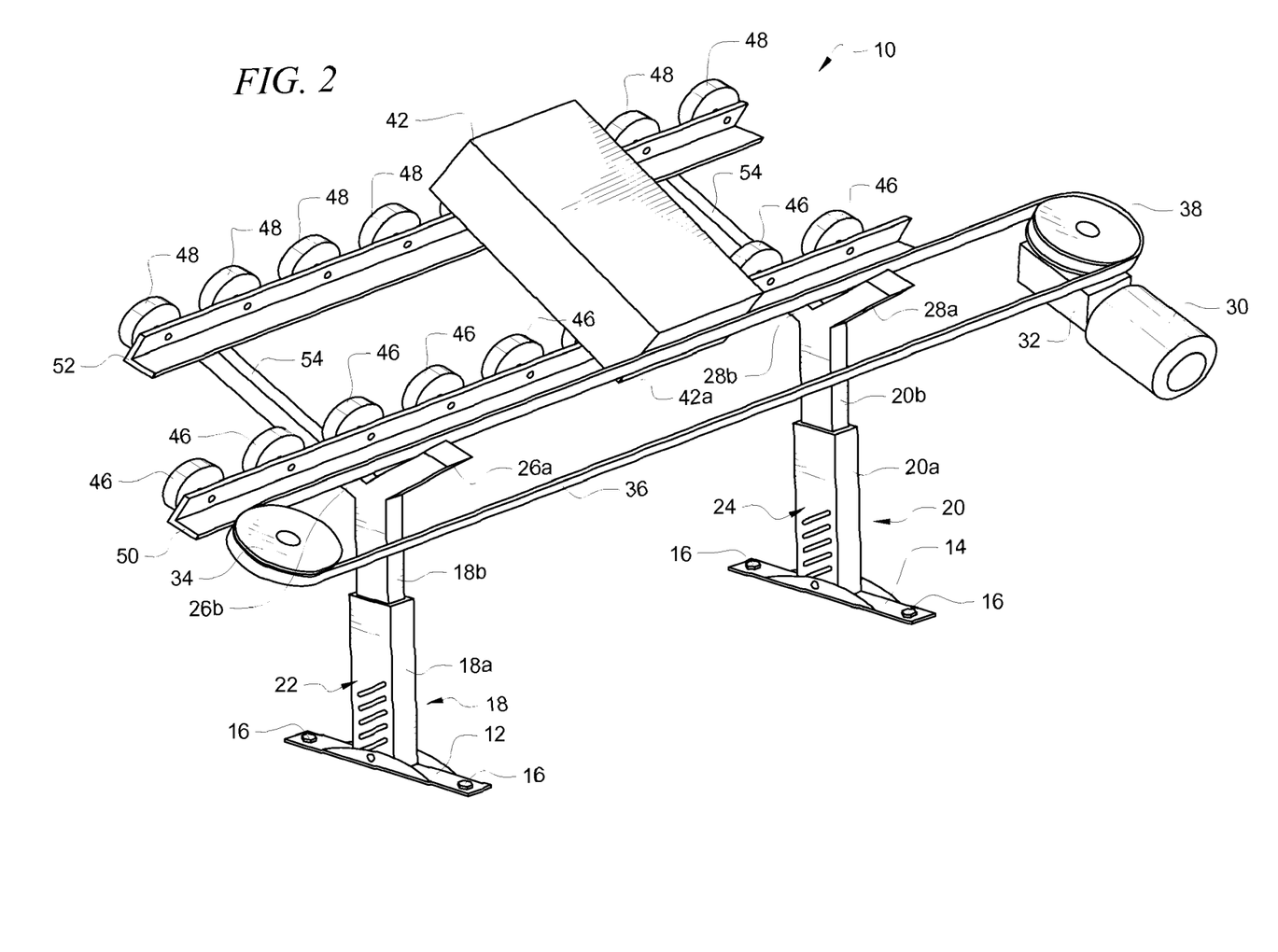
FIG. 2 is a perspective view of the embodiment of FIG. 1.

Referring now to FIGS. 1 and 2, it will there be seen that an illustrative embodiment of the invention is denoted as a whole by the reference numeral 10.

Novel conveyor system 10 includes base members 12 and 14 that overlie and are secured to a floor or other support surface by bolts, collectively denoted 16, or other suitable fastening means. Alternatively, the novel conveyor system may be mounted on caster wheels or other movable supports such as foot pads that are not fastened to the support surface. Only two of such base members are depicted but it should be understood that any number of base members may be employed to define any path of travel. The simple, straight path of travel depicted in FIGS. 1 and 2 does not limit the scope of the invention but merely simplifies the description and drawings.

Upstanding telescoping posts 18, 20 are longitudinally spaced apart from one another and respectively include hollow lower parts 18a, 20a that slideably receive upper parts 18b, 20b therewithin. Suitable vertically spaced apart locking means, collectively denoted 22, 24, enable a user to telescopically adjust the height of said posts.

Forward support arm 26a surmounts post 18 as does rearward support arm 26b. Forward support arm 28a surmounts post 20 as does rearward support arm 28b. Forward and rearward support arms 26a, 26b cooperatively form a "V"-shape, as do forward and rearward support arms 28a, 28b. The angle between said support arms is substantially ninety degrees (90°) because forward support arms 26a, 28a are part of a support structure that supports bottom wall 42a of a product container 42 and rearward support arms 26b, 28b are part of a support structure that supports a side wall of said product container. However, this ninety degree (90°) angle does not limit the invention because applications for handling product containers of irregular shape may require different angles between said forward and rearward support arms and such different angles are within the scope of this invention.

Motor 30 includes an output shaft, not depicted, to which is attached a gear, not shown, that is disposed within gearbox 32 and which meshingly engages at least one other gear within said gearbox. A driven output shaft 33 extends from gearbox 32 in substantially ninety degree (90°) relation to said driving output shaft and in substantially parallel relation to forward support arms 26a, 28a.

Drive wheel 34, depicted in FIGS. 1 and 2, is mounted for conjoint rotation to driven output shaft 33 and drive belt 36, best depicted in FIG. 1, engages said drive wheel. Driven wheel 38 engages an opposite end of drive belt 36. Idler roller 40, mounted near said driven wheel 38, is conventional. The term drive "belt" is used for convenience but said belt could be replaced by a band, rope, chain, or the like, all of which are referred to by the term "drive means."

FIG. 2 is a view of the fourth embodiment of the invention but it may be interpreted as a composite view that includes the first three embodiments as well.

Only the short-short structure of the first embodiment is employed when product container 42 is small, i.e., relatively narrow in width and low in height. Bottom wall 42a in solid lines of such container is actively supported by drive means 36 only. Reference numeral 42b indicates the top wall of such low profile, narrow width container. The unnumbered side wall of said small product container is passively supported by a plurality of primary passive rollers or wheels 46 that are mounted to longitudinally-extending rearward primary support rail 50. As mentioned above, this first embodiment also contemplates the elimination of wheels 46 and the use of rail 50, properly re-positioned, as the passive support means for the product container.

Only the long-short structure of the second embodiment is employed when product container 42 is relatively narrow in width as in the first embodiment but taller in height as indicated by top wall 42c in solid lines of such product container. Narrow in width bottom wall 42a of such container is actively supported by drive means 36 only. The unnumbered side wall of said taller product container is passively supported in part by the plurality of primary passive rollers or wheels 46 that are mounted to longitudinally-extending rearward primary support rail 50 as in the first embodiment, and this second embodiment also contemplates the elimination of wheels 46 and the use of rail 50, properly re-positioned, as the passive support means for the product container. This taller product container is also passively supported by a plurality of rearward secondary support wheels 48 that are rotatably mounted to rearward secondary support rail 52 which rail 52 may also be re-positioned and used as the secondary passive support means without said wheels 48. Rearward secondary support rail 52 is mounted at its opposite ends to rearward extensions 54, one of which extend from rearward support arm 26b and another of which extends from rearward support arm 28b as best depicted in FIG. 2. It should also be observed that FIG. 2 is a perspective view of the second embodiment of the invention.

Only the short-long structure of the third embodiment is employed when product container 42 is larger in width than in the first and second embodiments but shorter in height than the second embodiment. Extended bottom wall 42d of such container is actively supported by drive means 36 and by forward secondary support wheels 56 that are mounted along the extent of forward secondary support rail 58. Said forward secondary support rail 58 is mounted at its opposite ends to the respective distal fee ends of forward extension members 60, each of which extends from forward support arms 26a and 28a. The side wall of said low profile product container is passively supported by the plurality of rearward primary passive rollers or wheels 46 that are mounted to longitudinally-extending rearward primary support rail 50 as in the first embodiment, and this third embodiment also contemplates the elimination of wheels 46 and the use of rail 50, properly re-positioned, as the passive support means for the product container.

The long-long structure of the fourth embodiment is employed when product container 42 has the height of the second embodiment and the width of the third embodiment so that its unsupported sidewall is denoted 42e. The parts that support it are depicted in FIG. 1 and have already been disclosed in connection with the first three embodiments.

Although not depicted, it should be understood that further extension members could be added to extension members 54 and 60 and that further support rails, with or without wheels, could be mounted to the respective distal free ends thereof.

Figure 3:
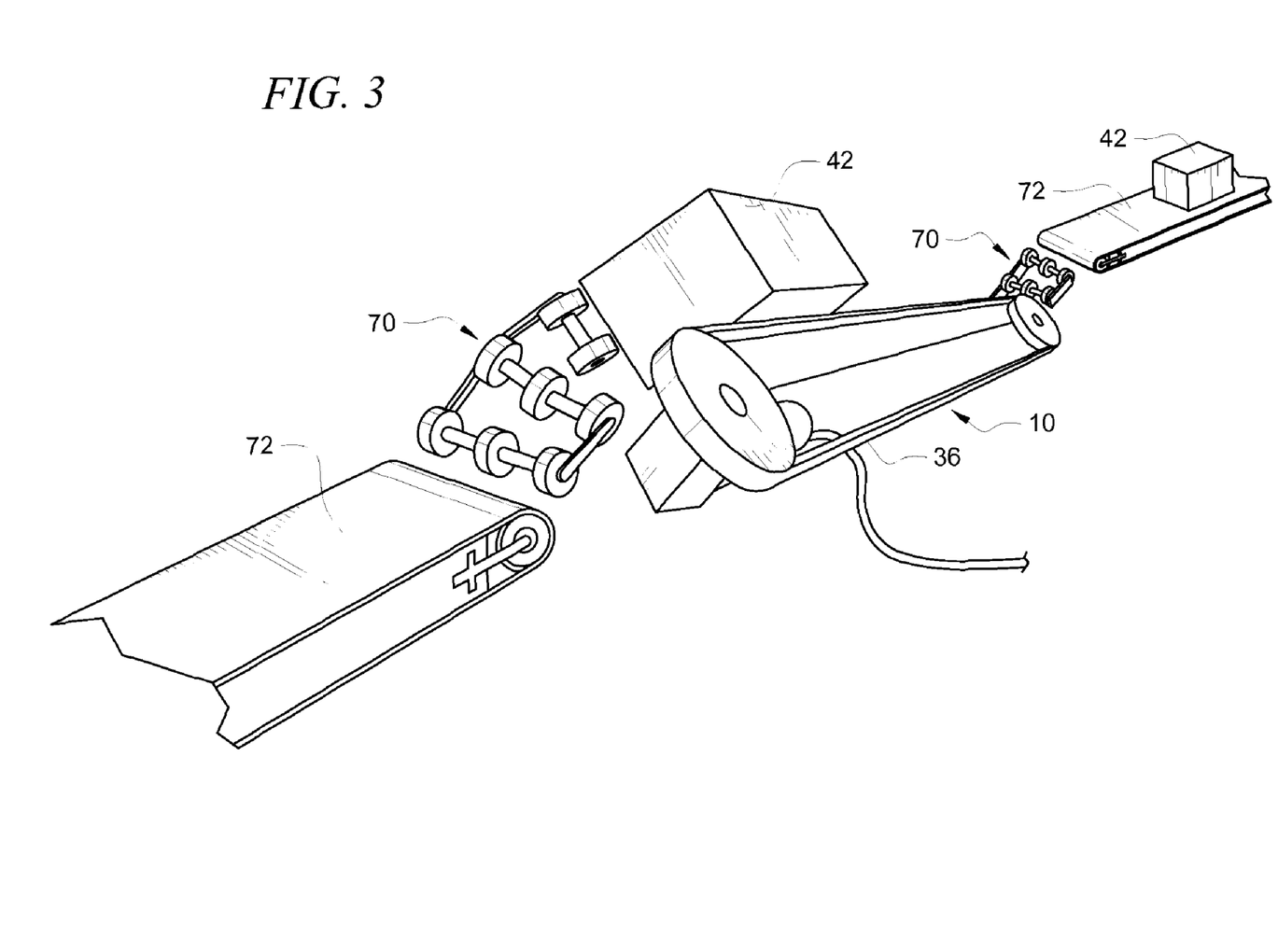
FIG. 3 is a perspective view depicting a helical transition from a conventional conveyor system to the novel conveyor system.

There may be applications where the novel, guide rail-free conveyor system 10 must interface with a conventional conveyor system. FIG. 3 depicts how a set of rollers 70 can be twisted into a helical configuration to tilt containers 42 as they are discharged from a conventional horizontally disposed conveyor belt 72 onto the novel tilted conveyor system 10. A second set of rails or rollers, also denoted 70, is twisted into a helical configuration in an opposite direction at the discharge end of the novel system to put the containers back into a conventional system.

Figure 4:
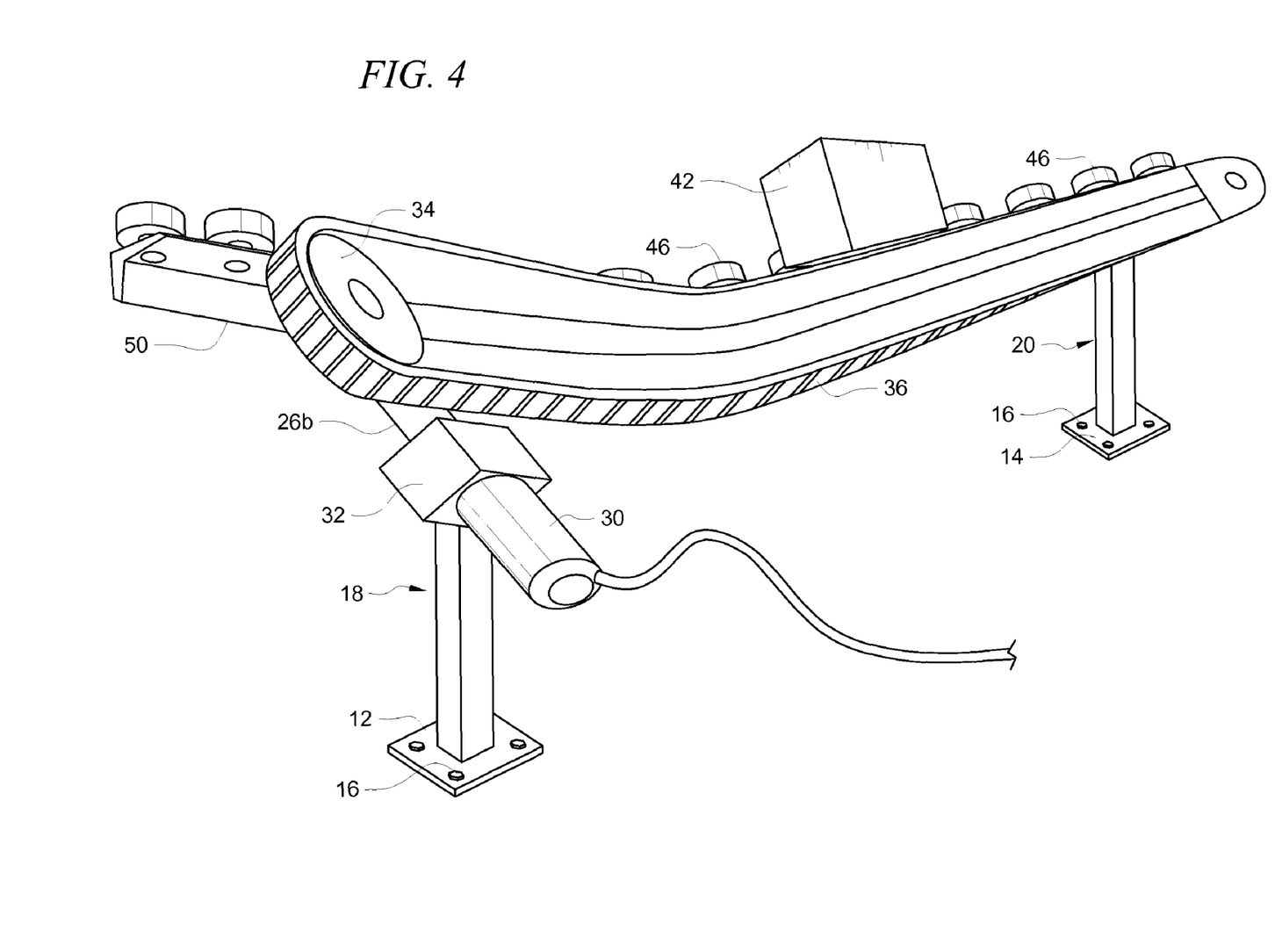
FIG. 4 is a perspective view depicting a change in elevation of the novel conveyor system.

FIG. 4 depicts how the novel system can undergo a change in elevation so that it need not always be positioned at the same elevation as a conventional system. Support rail 50 is bent upwardly as depicted but it can also be bent downwardly.

Wheels 46, 48, and 56 may take the form of rotatably mounted balls, plate rollers, or combinations thereof. All reference herein to wheels should be understood to include such equivalent structures. Moreover, as aforesaid, any such rolling support means may be replaced by a rail or similar low-friction support means. It should also be observed that wheels, if employed, may be mounted to axles that are directly connected to support rails as depicted in these drawings, or such wheels may be rotatably mounted in brackets or the like which are in turn mounted to the support rails.

The novel structure disclosed herein tilts the containers relative to a vertical axis so that said containers rest against and are supported or cradled by the novel structure. Accordingly, the containers rest against the novel structure under the influence of gravity, thereby eliminating the need for guide rails.

Containers can also be accumulated on the driving surface which may incorporate rollers to allow increased low-friction accumulation. In other words, drive belt 36 may include rollers or the like that enable the forward progress of a container to be impeded if a system designer desires such impedance, there being no requirement that drive belt 36 be a continuous driving force that disallows such accumulation.

Figure 5:
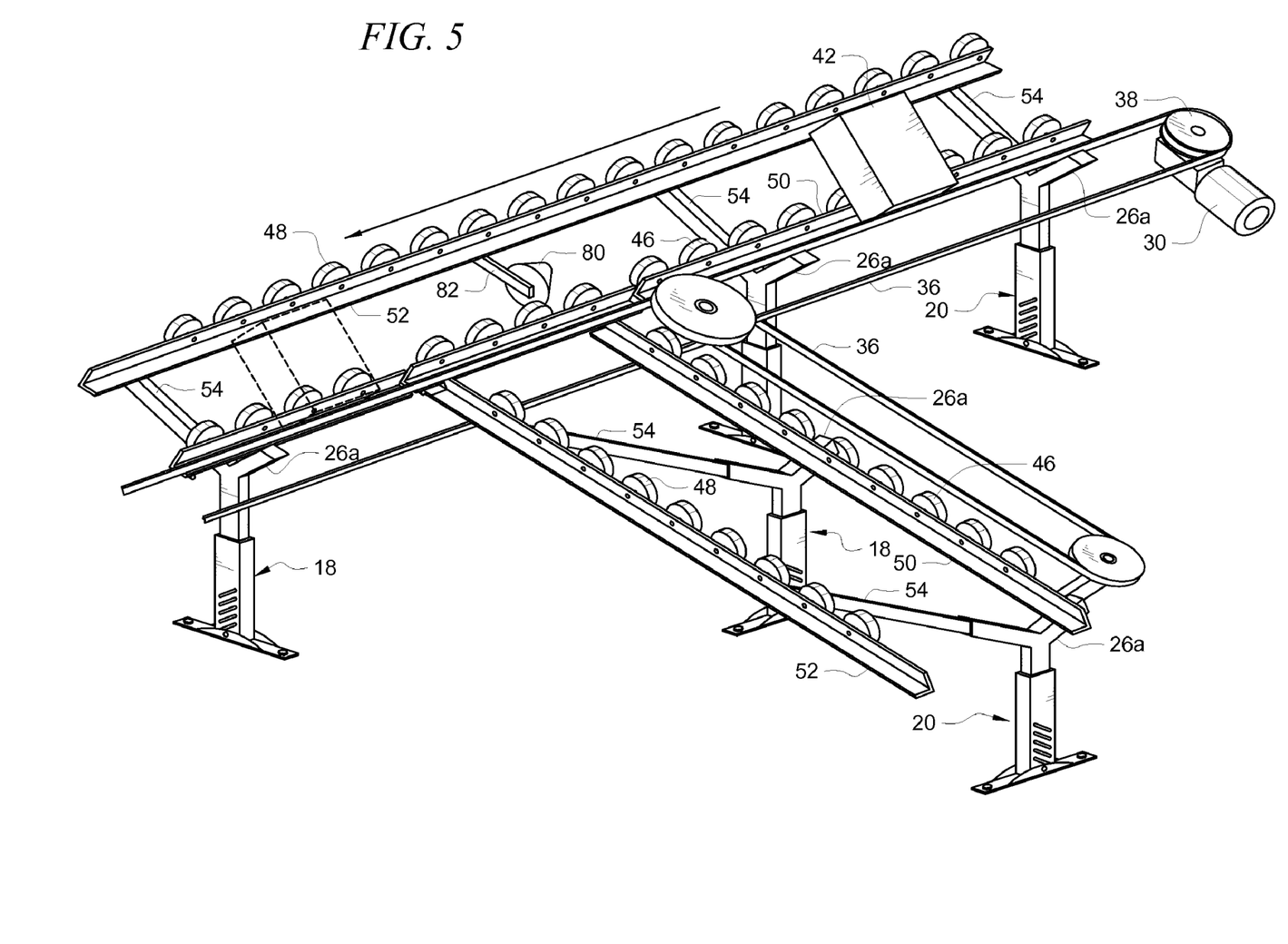
FIG. 5 is a perspective view depicting a corner-turning assembly that forms a part of the novel conveyor system.
Figure 6:
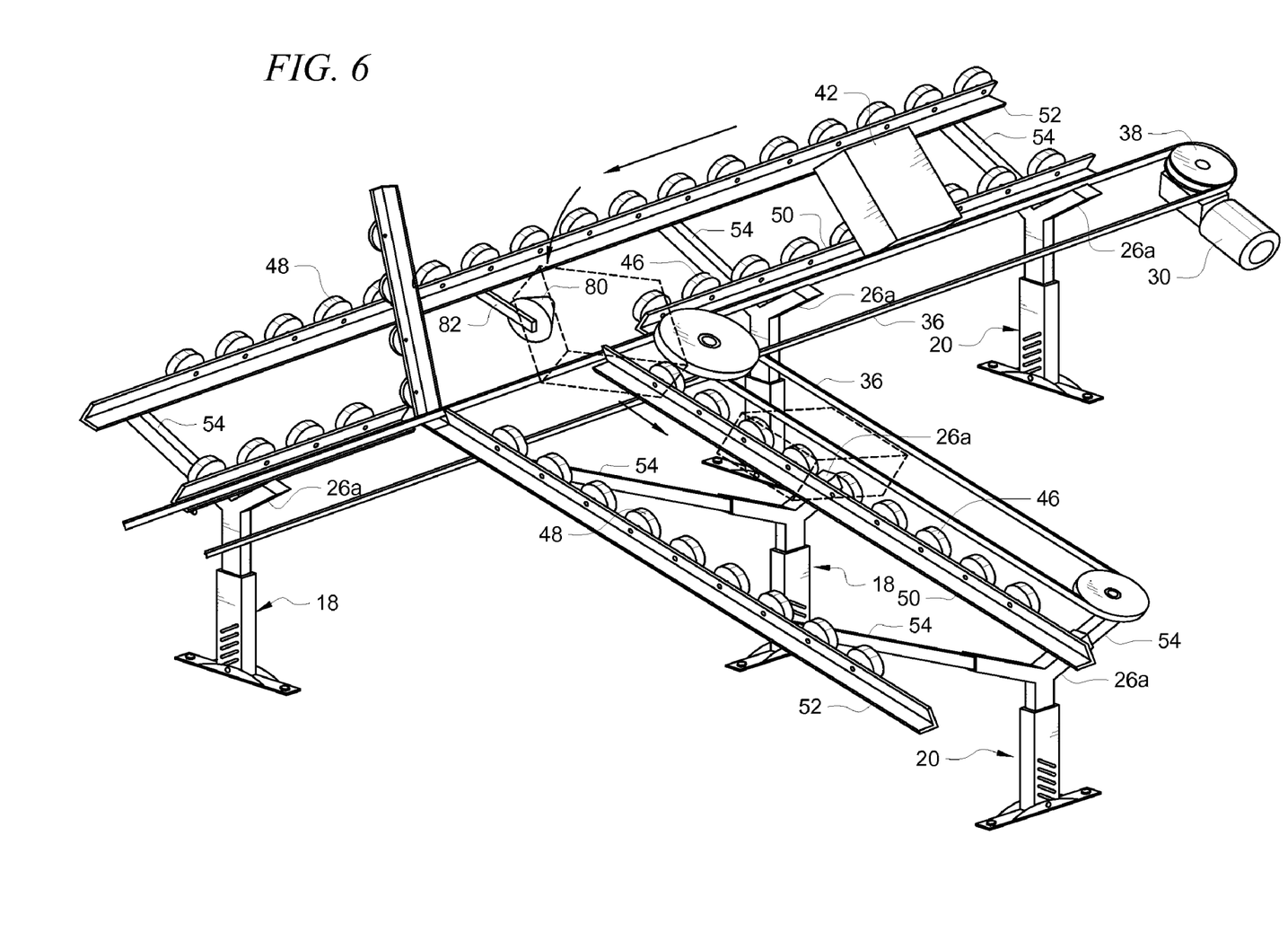
FIG. 6 is a view like that of FIG. 5, depicting a container package as it undergoes the corner-turning process.

Corners include, on a first side, a driven band, rope, belt, chain, driven wheel, or the like, and on a second, opposite side, balls, rollers, plates, wheels, rails, or various combinations thereof. FIGS. 5 and 6 depict a product container negotiating a corner. It will be noted that said Figs. depict the long-short or second embodiment of the invention. Turning cone 80 is mounted to bracket 82 that is mounted to secondary passive support rail 52. Product container 42 will continue to travel in a straight direction when the system is in its FIG. 5 configuration but it will negotiate a ninety degree (90°) turn when in its FIG. 6 configuration. Note in FIG. 6 that a section of rearward primary support rail 50 is hingedly mounted so that it can swing into the FIG. 6 position. When said section 50 is upraised, turning cone 80 deflects product container 42 onto the conveyor structure disposed ninety degrees (90°) to the main conveyor section.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A conveyor system, comprising:
   a vertical first post;
   a vertical second post;
   said first and second posts disposed in longitudinally spaced apart relation to one another;
   a first forward support arm and a first rearward support arm surmounting said first post and being interconnected to one another;
   said first forward support arm and said first rearward support arm collectively forming a "V"-shape, said "V"-shape being formed by said first forward support arm and said first rearward support arm only;
   a second forward support arm and a second rearward support arm surmounting said second post;
   said second forward support arm and said second rearward support arm collectively forming a "V"-shape, said "V"-shape being formed only by said second forward support arm and said second rearward support arm;
   a longitudinally-extending forward drive belt mounted for rotation about a path of travel that extends only between said first and second forward support arms;
   a longitudinally-extending rearward primary support rail supported at opposite ends by said first and second rearward support arms;
   said rearward primary support rail adapted to slidingly support a sidewall of a product container that is tilted from a vertical position so that it lies at an angle defined by said first and second rearward support arms;
   said forward drive belt adapted to support a bottom wall of said product container;
   whereby said product container is held in said tilted configuration by gravity;
   whereby said conveyor system may follow a path of travel including curvatures that include no guide rails; and
   whereby said conveyor system includes a single conveyor belt and a single primary support rail that cooperate with one another to hold said product container in said tilted configuration.

2. The conveyor system of claim 1, further comprising:
   a plurality of rearward support wheels rotatably mounted to said rearward primary support rail;
   each rearward support wheel of said plurality of rearward support wheels being rotatable about an axis substantially perpendicular to said rearward primary support rail;
   each rearward support wheel adapted to rollingly engage said sidewall of said product container;
   said forward drive belt being flat;
   said container being supported at its bottom wall by said flat forward drive belt and at its sidewall by said plurality of rearward support wheels, said flat forward drive belt making full abutting contact with said container bottom wall.

3. The conveyor system of claim 1, further comprising:
   a first rearward extension member secured to said first rearward support arm;
   a second rearward extension member secured to said second rearward support arm;
   a rearward secondary support rail having opposite ends mounted to respective distal free ends of said first and second rearward extension members;
   said rearward secondary support rail adapted to slidingly support said sidewall of a product container that is tilted from a vertical position so that it lies at the angle defined by said first and second rearward support arms.

4. The conveyor system of claim 3, further comprising:
   a plurality of rearward support wheels rotatably mounted to said rearward secondary support rail;
   each rearward support wheel of said plurality of rearward support wheels being rotatable about an axis substantially perpendicular to said rearward secondary support rail;
   each rearward support wheel adapted to rollingly engage said sidewall of said product container.

5. The conveyor system of claim 1, further comprising:
   a first forward extension member secured to said first forward support arm;
   a second forward extension member secured to said second forward support arm;
   a secondary forward support rail having opposite ends mounted to respective distal free ends of said first and second forward extension members;
   said forward secondary support rail adapted to slidingly support a bottom wall of said product container that is tilted from a vertical position so that it lies at the angle defined by said first and second rearward arm members.

6. The conveyor system of claim 5, further comprising:
   a plurality of forward support wheels rotatably mounted to said secondary forward support rail;
   each forward support wheel of said plurality of forward support wheels being rotatable about an axis substantially perpendicular to said secondary forward support rail;
   each forward support wheel adapted to rollingly engage said bottom wall of said product container.

7. The conveyor system of claim 1, further comprising:
   a first rearward extension member secured to said first rearward support arm;
   a second rearward extension member secured to said second rearward support arm;
   a rearward secondary support rail having opposite ends mounted to respective distal free ends of said first and second rearward extension members;
   a first forward extension member secured to said first forward support arm;
   a second forward extension member secured to said second forward support arm;
   a forward secondary support rail having opposite ends mounted to respective distal free ends of said first and second forward extension members;
   said forward secondary support rail adapted to slidingly support a bottom wall of said product container that is tilted from a vertical position so that it lies at the angle defined by said first and second forward arm members.

8. The conveyor system of claim 7, further comprising:
   a plurality of forward support wheels rotatably mounted to said forward secondary support rail;
   each forward support wheel of said plurality of forward support wheels being rotatable about an axis substantially perpendicular to said forward secondary support rail;
   each forward support wheel adapted to rollingly engage said bottom wall of said product container.

* * * * *